June 18, 1935.  W. C. VAN GEEL ET AL  2,005,279
ELECTRICAL CONDENSER
Filed June 29, 1931
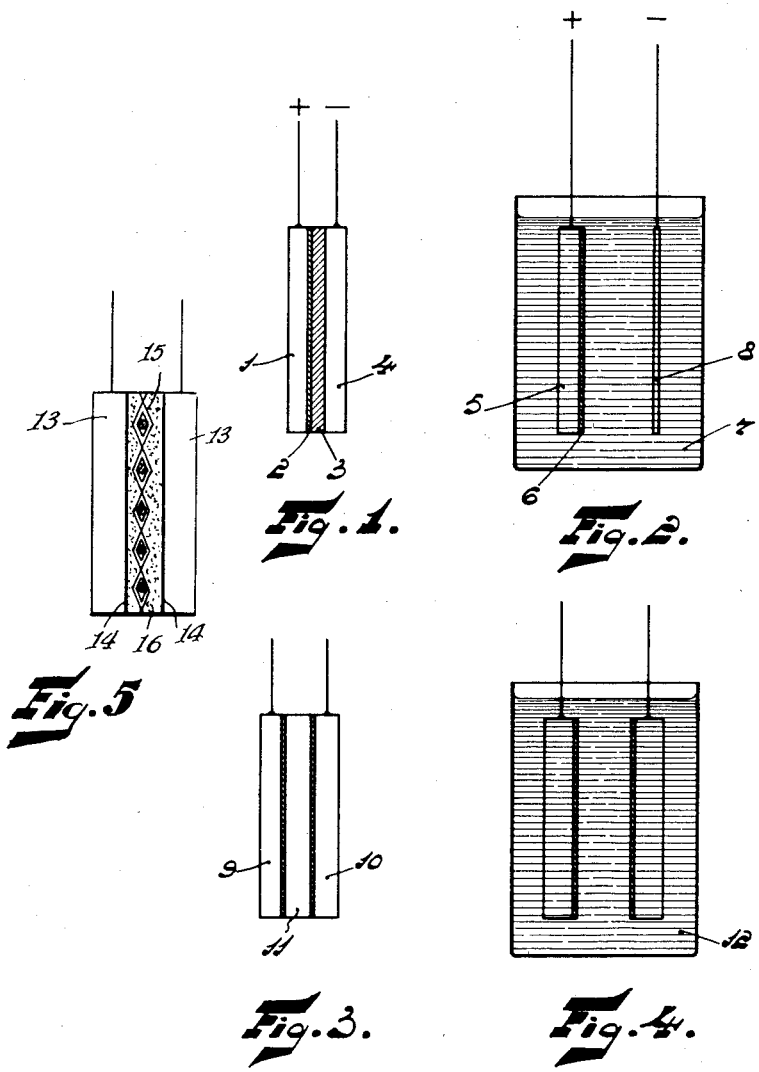
Inventors:
W. C. van Geel
and H. Emmens,
by
Atty.

Patented June 18, 1935

2,005,279

UNITED STATES PATENT OFFICE 2,005,279

ELECTRICAL CONDENSER

Willem Christiaan van Geel and Hendrik Emmens, Eindhoven, Netherlands, assignors to N. V. Philips' Gloeilampenfabrieken, Eindhoven, Netherlands Application June 29, 1931, Serial No. 547,750
In the Netherlands July 24, 1930

7 Claims. (Cl. 175—315)

Condensers, the plates and the dielectric of which constitute at least one rectifier cell are already commonly known. With the types designed for alternating current the condenser as a rule comprises two rectifier cells connected in opposition. If such a system of rectifiers is inserted in an alternating current circuit, one rectifier will allow the passage of current during one half-cycle of the alternating current and act simultaneously as one of the electrodes of the condenser, whereas the other rectifier which does not allow the current to pass in this direction constitutes the second electrode and the dielectric of the condenser. During the other half-cycle of the alternating current, this operation is the reverse.

The invention has reference to condensers of the abovementioned type comprising at least one rectifier cell. With a condenser according to the invention the rectifier cell comprises one electrode which at least partly consists of a sheet of one of the metals of the first undergroup of the fourth main group of the periodic system of the elements, for example zirconium, hafnium, thorium, titanium. According to the invention the dielectric of the cell consists of a film of a stable chemical compound obtained by conversion of the electrode material on the surface of the electrode. The conversion is preferably effected by chemical or electrolytic agency but evidently may be effected in any suitable manner. Only those compounds come in consideration for the dielectric which are electrically non-conductive and according to the invention among them those compounds are selected which are the most stable or in other words those which can only be converted into other compounds by powerful chemical re-agents.

It has already been proposed to provide the said rectifier cells with an electrode of certain metals, for example aluminium or copper and a dielectric consisting of compounds, for example oxides of these metals, obtained in the manner above referred to. It has, however, been found that these compounds are chemically less stable than the compounds of the metals of the first undergroup of the fourth main group suitable for this purpose. The dielectric properties of the said known compounds are subject to alteration, for example as a result of chemical action such as weathering, so that it is impossible to maintain constant the rectifying action of such a cell for a given interval of time. In contradistinction thereto the compounds used as a dielectric in a rectifier cell according to the invention are so stable that the dielectric properties are not subject to alteration. Owing to the said metals being used as rolled-out sheet plates, the compounds can adhere very closely to the surface from which they are produced and these compounds form a film which although very thin is nevertheless extremely firm and coherent.

As compounds adapted for this purpose, the phosphates may be mentioned by way of example. It has, however, been found that the oxides of the suggested metals exhibit both in chemical and mechanical respect the most stable properties, so that they are eminently suited to act as the dielectric in a rectifier cell forming part of a condenser according to the invention. A preferred electrolytic method of applying the film of oxide to the electrodes consists in using sodium monosulphide ($Na_2S$) as the electrolyte. Such a film adheres very firmly to the electrode and covers its entire surface with a non-porous film which is of great importance in connection with the condenser action. The other properties of the rectifier cell constructed in the manner indicated are also such that a cell of this kind is well suited as a component member of a condenser. Good results are obtained if one of the electrodes of the cell is made of zirconium and zirconium oxide is chosen as the dielectric.

It has been found that the rectifying action of the cells here described can be ascribed at least partly to the difference in electron emissive power of the two electrodes. The cell only allows the passage of electrons in the direction of the electrode having the greater emissive power towards the electrode having a smaller emissive power. If in the condenser according to the invention, one of the electrodes of the rectifier cell is made of zirconium, which as is well known has a great electron emissive power, to obtain a good rectifying action, the other electrode will preferably be made of a material having a smaller emissive power than zirconium. Manganese dioxide ($MnO_2$) gives highly satisfactory results in conjunction with zirconium. Other materials, such as a combination of copper iodide and iodine or copper sulphide may be used with good results instead of manganese dioxide ($MnO_2$). It has been found that during the operation of the condenser the film of dielectric may become damaged and according to the invention said damage can be repaired by mechanically admixing the material of smaller emissive power with an oxygen readily emanating substance, such for example as potassium chlorate ($KClO_3$) potassium manganate ($KMnO_4$), barium peroxide ($BaO_2$) and the like. In the presence of heat the potassium chlorate ($KClO_3$) oxygen will evolve so that the dielectric, for example zirconium oxide ($ZrO_2$), when partly destroyed, for example as a result of excessive passage of current, can be replaced by the zirconium oxide ($ZrO_2$) generated as a result of the oxidation of the electrode by the liberated oxygen.

Instead of using a solid substance as the electrode of low emissive power, an electrolyte for example a potassium (KOH)-solution may be used so that a so-called electrolytic condenser is produced. Phosphoric acid or an ammonium borate solution also fulfills very well the requisite conditions.

Condensers having a solid substance as the material of smaller emissive power present the disadvantage that their contact with the dielectric of the rectifier is less satisfactory than in the case of a liquid. If however, the use of a liquid is to be avoided, it is possible to overcome this disadvantage by admixing the solid substance, for example manganese dioxide ($MnO_2$), with a hydroscopic substance, for example phosphorus pentaoxide ($P_2O_5$). As a result of the absorption of water, a soft viscous mass is produced which ensures a good contact on the entire dielectric surface. Preferably, a piece of fabric is soaked in a pasty mixture of manganese dioxide ($MnO_2$) and phosphorus pentaoxide ($P_2O_5$) and is then used as an electrode. In order to obtain a good electric contact between the electrode and the corresponding connecting terminal of the condenser, a plate of electrically well conducting material, for example of copper, may be applied against the fabric and may be connected to the connecting terminal.

The condenser according to the invention when comprising only one rectifier cell is naturally only adapted to be charged by pure direct current or by pulsating direct current, and may consist of a plate of zirconium upon which zirconium oxide is applied in the manner hereinbefore indicated and which is contacting with a plate of manganese dioxide. According to the invention, an electrolytic condenser of this kind may correspondingly consist of a vessel into which, for example, a potassium hydroxide (KOH)-solution is introduced and of a plate of zirconium having a film of zirconiumoxide applied to it in accordance with the invention, immersed in the solution. In order to obtain a well conducting connection between the potassium hydroxide (KOH)-solution and one of the connecting terminals of the condensers, a platinum or zirconium stylus may be introduced into the solution and be secured to the connecting terminals by a conductive connection.

The drawback of condensers having only one rectifier cell consists in that their connection requires observance of the proper polarity as reversed connection causes incorrect operation and damages the condensers. The connecting terminals have therefore to be provided always with indications of polarity. This disadvantage is not inherent with condensers which comprise two rectifier cells connected in opposition as in this case it is immaterial in what manner the connections are established. One of the two rectifiers—no matter which one—will always act as a condnser irrespective of the polarity of the voltage supplied. A condenser of this kind is consequently adapted for alternating current as well as for pulsating direct current and also for being charged by a pure direct current.

With a condenser of this kind the material of low emissive power can act as a common electrode for the two rectifier cells and this is also the case when in the condenser according to the invention an electrolyte is used as the material of low emissive power.

In order that the invention may be clearly understood and readily carried into effect, two forms of construction of a condenser in accordance therewith will now be described more fully with reference to the accompanying drawing in which, Figure 1 is a diagrammatic representation of a condenser comprising a single rectifier cell and using a solid substance as the electrode of low emissive power.

Fig. 2 is a diagrammatic representation of a condenser comprising a single rectifier cell and having an electrolyte as the electrode of low emissive power.

Figs. 3 and 4 are diagrammatic representations of condensers of the type shown in Figs. 1 and 2, respectively, but having two rectifier cells connected in opposition.

Fig. 5 is a diagrammatic representation of a condenser of the type shown in Fig. 3 provided with a spacer also serving as a carrier for a pasty compound acting as the electrode of lower emissivity.

The condenser shown in Figure 1 comprises a single rectifier cell and is consequently only adapted for pulsating direct current or for being charged by means of a pure direct current. For this purpose the polarity of the condenser must be indicated. The positive electrode consists of a plate of sheet zirconium 1 which has applied to it by chemical or electrolytic agency a film of zirconium oxide 2 which has the function of a dielectric. The other electrode of the rectifier, and thus also of the condenser, consists of a plate of manganese dioxide 3 which bears on the zirconium oxide. The plate of manganese dioxide is engaged by a plate 4 of electrically well conducting material, for example copper, to which the negative connecting terminal of the condenser is connected.

With an electrolytic condenser as shown in Figure 2, which consists likewise of a single rectifier cell, the positive electrode consists of a plate of sheet zirconium 5 and the dielectric of a film of zirconium oxide 6 applied thereto, whereas the negative electrode is formed by the electrolyte itself, for example a KOH solution 7. The electric connection of this electrode to the negative connecting terminal of the condenser is established by a rod of platinum or zirconium 8.

The condenser shown in Figure 3 comprises two rectifier cells 9 and 10 connected in opposition and containing each an electrode of zirconium having applied to it a film of zirconium oxide, a plate of manganese dioxide 11 acting as a common electrode. With the electrolytic condenser shown in Figure 4 which also contains two rectifier cells connected in opposition, the plate of manganese dioxide shown in Figure 3 is replaced by an electrolyte 12, for example a KOH solution, acting as a common electrode.

In Fig. 5, a condenser is shown having two rectifier cells, in which the two electrodes 13—13 consist, for instance, of sheets of zirconium provided with zirconium oxide layers 14—14. Between the two electrodes there is provided a spacer 15, for instance, a piece of fabric which acts as the carrier for the pasty mass 16 comprising the material of lower emissive power, for instance, $MnO_2$ with the possible admixture of a hygroscopic material, for instance $P_2O_5$.

Various alterations are possible without departing from the scope of the invention. The plates of sheets of metals of the first undergroup of the fourth main group which are used can readily be rolled out thinly and for use in a condenser may be corrugated or crimped so that a large area is obtained from a small amount of material. As the said metals are used in a ductile state a sufficient consistency is ensured, in the case of variously shaped thin plates. In addition, a smooth even surface can be obtained, which is important in connection with the properties of the oxide film formed on the metal.

Instead of using the said metals in a pure state, alloys thereof may be used.

What we claim is:—

1. A condenser comprising at least one rectifier cell, said cell comprising an electrode at least partly consisting of a sheet of one of the metals of the first undergroup of the fourth main group of the periodic system of the elements, and a dielectric consisting of a film of a stable chemical compound obtained by conversion of the electrode material on the surface of said electrode and an electrolyte, having a smaller emissive power than said electrode, consisting of a potassium hydroxide (KOH)-solution, and a second electrode immersed in said solution.

2. A condenser comprising at least one rectifier cell, said cell comprising an electrode which at least partly consists of a sheet of one of the metals of the first undergroup of the fourth main group of the periodic system of the elements, and a dielectric consisting of a film of a stable chemical compound obtained by conversion of the electrode material on the surface of said electrode, and an electrolyte, having a smaller emissive power than said electrode, and consisting of manganese dioxide ($MnO_2$).

3. A condenser comprising at least one rectifier cell, said cell comprising an electrode at least partly consisting of a sheet of one of the metals of the first undergroup of the fourth main group of the periodic system of the elements, and a dielectric consisting of a film of a stable chemical compound obtained by conversion of the electrode material on the surface of said electrode, and an electrolyte, having a smaller emissive power than said electrode, consisting of manganese dioxide ($MnO_2$) and containing as a hygroscopic substance phosphorus pentoxide ($P_2O_5$).

4. A condenser comprising at least one rectifier cell, said cell comprising an electrode at least partly consisting of a sheet of one of the metals of the first undergroup of the fourth main group of the periodic system of the elements, and a dielectric consisting of a film of a stable chemical compound obtained by conversion of the electrode material on the surface of said electrode, and an electrolyte consisting of a material having a smaller emissive power than said electrode and containing an oxygen readily liberating substance.

5. A condenser comprising at least one rectifier cell, said cell comprising an electrode which at least partly consists of a sheet of one of the metals of the first undergroup of the fourth main group of the periodic system of the elements, and a dielectric consisting of a film of a stable chemical compound obtained by conversion of the electrode material on the surface of said electrode, and an electrolyte comprising a material having a smaller emissive power than that of said electrode, said electrolyte consisting of a strip of fabric soaked in a pasty mixture of the material of smaller emissive power and of a hygroscopic substance, and a substance which readily gives up oxygen being added to said mixture.

6. A condenser comprising at least one rectifier cell, said cell comprising an electrode which at least partly consists of a sheet of one of the metals of the first undergroup of the fourth main group of the periodic system of the elements, and a dielectric consisting of a film of a stable chemical compound obtained by conversion of the electrode material on the surface of said electrode, and an electrolyte consisting of a material having a smaller emissive power than the electrode and containing at least one of the substances potassium chlorate ($KClO_3$), barium dioxide ($BaO_2$), potassium manganate ($KMnO_4$).

7. A condenser comprising at least one rectifier cell, said cell comprising an electrode at least partly consisting of a sheet of one of the metals of the first undergroup of the fourth main group of the periodic system of the elements, and a dielectric consisting of a film of a stable chemical compound obtained by conversion of the electrode material on the surface of said electrode, and an electrolyte, having a smaller emissive power than the electrode, consisting of manganese dioxide ($MnO_2$), to which at least one of the substances potassium chlorate ($KClO_3$), barium dioxide ($BaO_2$), potassium manganate ($KMnO_4$) is added.

WILLEM CHRISTIAAN VAN GEEL.
HENDRIK EMMENS.